(12) United States Patent
Yen et al.

(10) Patent No.: US 6,762,774 B2
(45) Date of Patent: Jul. 13, 2004

(54) METHOD FOR REMINDING A USER OF A COMPUTER SYSTEM

(75) Inventors: Hsiang Tsun Yen, Taipei (TW); Chang Sheng Wu, Taipei (TW)

(73) Assignee: Synq Technology Inc., Taipei (TW)

( * ) Notice: Subject to any disclaimer, the term of this patent is extended or adjusted under 35 U.S.C. 154(b) by 566 days.

(21) Appl. No.: 09/920,835

(22) Filed: Aug. 3, 2001

(65) Prior Publication Data

US 2002/0135606 A1 Sep. 26, 2002

(30) Foreign Application Priority Data

Mar. 23, 2001 (TW) ........................................ 90107008 A

(51) Int. Cl.$^7$ ................................................ G09G 5/00
(52) U.S. Cl. ........................ 345/774; 345/772; 345/706; 345/844
(58) Field of Search ................................. 345/774, 706, 345/710, 772, 779, 839, 859, 866, 865, 861, 844, 957

(56) References Cited

U.S. PATENT DOCUMENTS 6,097,390 A * 8/2000 Marks ........................ 345/772
6,445,400 B1 * 9/2002 Maddalozzo et al. ....... 345/803
2001/0055017 A1 * 12/2001 Ording ........................ 345/440
2002/0174370 A1 * 11/2002 Berstis ........................ 713/300

* cited by examiner

Primary Examiner—Ba Huynh
(74) Attorney, Agent, or Firm—Quintero Law Office

(57) ABSTRACT

A method for reminding a user is applied to a computer system. The method includes a preset appearance-changing value and a appearance-changing counter with an initial value "0". The method comprises: a) determining if a value of the appearance-changing counter is less than the preset appearance-changing value; if yes, going to step b; otherwise, terminating the method; b) assigning a first appearance-changing value to a appearance parameter of the object; c) pausing for a appearance-changing intermittence time; d) assigning a second appearance-changing value to the appearance parameter of the object; e) pausing for the appearance-changing intermittence time; and f) adding "1" to the value of the appearance-changing counter and going to step a. By providing the method for the present invention, the user can then be reminded by appearance-changing of the object on the screen.

33 Claims, 3 Drawing Sheets

METHOD FOR REMINDING A USER OF A COMPUTER SYSTEM

REFERENCE TO RELATED APPLICATION

The present application claims priority to Taiwan application No.090107008, entitled "A METHOD FOR REMINDING A USER OF A COMPUTER SYSTEM," filed on Mar. 23, 2001.

BACKGROUND OF THE INVENTION (1) Field of the Invention

The invention relates to a method for reminding a user of a computer system, and more particularly to a method for reminding a user of a computer system by changing the appearance of a particular object on a screen of the computer system.

(2) Description of the Prior Art

As the computer technology progresses promptly, various daily applications have been added to the computer usage; such as typewriting, calculating, mailing, information browsing, network shopping and so on. Definitely, as the computer become more versatile, the trend that people spend more and more time in front of the computer can be foreseen.

For a user working with a computer, it is quite possible that he/she will miss some other points, say a meeting time for example, while he/she focuses on a specific job on the computer. Therefore, if a device in the computer system can be provided to give the user a 10-minute warning, for example, prior to a meeting, the computer may become more friendly and more dependable.

The additional alerting function for the computer can not only make the computer system more humanized, but also provides a more efficient working environment. For example, if the computer is designed to watch the e-mail system, a special reminder can then be provided to alert the user while meeting an incoming mail so that the user may manage the message of the mail in time and thus plenty of time for checking mail prior to its arrival can be saved.

In the art, following methods have been applied to remind the user of the computer system: 1) flashing letters, 2) deforming a figure, 3) producing a voice, and 4) popping up a dialogue window. For example, when a new message is incoming through a general ICQ, the plot symbolizing the ICQ in the function bar at bottom of the screen will flash to remind the user. However, the plot in general is too tiny to be noticed. For example of a timing apparatus, while a setting time is met, the timing apparatus will produce a noise to remind the user. Yet, such a noise may not be suitable to some quiet working environments. On the other hand, popping up a dialogue window might be a noticeable and quite method to alert the user. However, the user may feel been interrupted sometimes by such a reminder, especially while he/she is working on a particular job.

Therefore, to come up with a quiet, noticeable and un-interrupting reminding method to the user of the computer is worthwhile.

SUMMARY OF THE INVENTION

Accordingly, it is a primary object of the present invention to provide a quiet, noticeable and un-interrupting method for reminding the user.

In accordance with the present invention, the method for reminding the user is applied to a computer system and is used to change appearance of an object on the computer screen while a particular event is met. The present invention includes a preset appearance-changing value and a appearance-changing counter, in which the appearance-changing counter has an initial value of zero. Step a of the method is to determine if the value of the appearance-changing counter is less than the preset appearance-changing value. If yes, the method will continue to step b. Otherwise, the method is ended. In step b, a appearance parameter of the object is assigned to be a first appearance value. Following step b, step c of the method is to pause for a appearance-changing intermittence time before processing step d. In step d of the method, the appearance parameter of the object is assigned to be a second appearance value. Step e that follows step d is to pause the object for another appearance-changing intermittence time before going to step f. In step f, one is added to the appearance-changing counter. Then, the method for the present invention will repeat the whole process by performing step a again.

It is an advantage of the present invention that By providing the method for reminding the user in accordance with the present invention, the user of the computer system is reminded in a quiet and noticeable way, and the current job of the user is not disturbed or interrupted.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for reminding the user. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The method for reminding the user in accordance with the present invention is triggered by an event to change appearance of an object on a computer screen repeatedly for having the user's attention upon the event. In the present invention, the object can be a user interface of the computer system. To have the appearance of the object be changed repeatedly, the method for the present invention has a loop control to perform repeatedly a step of altering a appearance parameter of the object. The appearance of the object displayed on the computer screen is controlled by the appearance parameter. The appearance parameter can be a coordinate parameter, an area parameter, a color parameter or any the like. Each of the parameters is assigned to be a specific value. Thereby, while the value of the appearance parameter is altered, the appearance of the object can be changed as well.

In one preferred embodiment of the present invention, the method is introduced to vibrate the object on the screen repeatedly for reminding the user. Such a vibration upon the object can be read as to alter repeatedly the position of the object on the screen. For example, to have the object vibrated or shifted between two fix points (say point A and point B) on the screen, the method can be used to repeatedly change the coordinate parameter of the object to either the coordinate of point A or the coordinate of point B.

Figure 1:
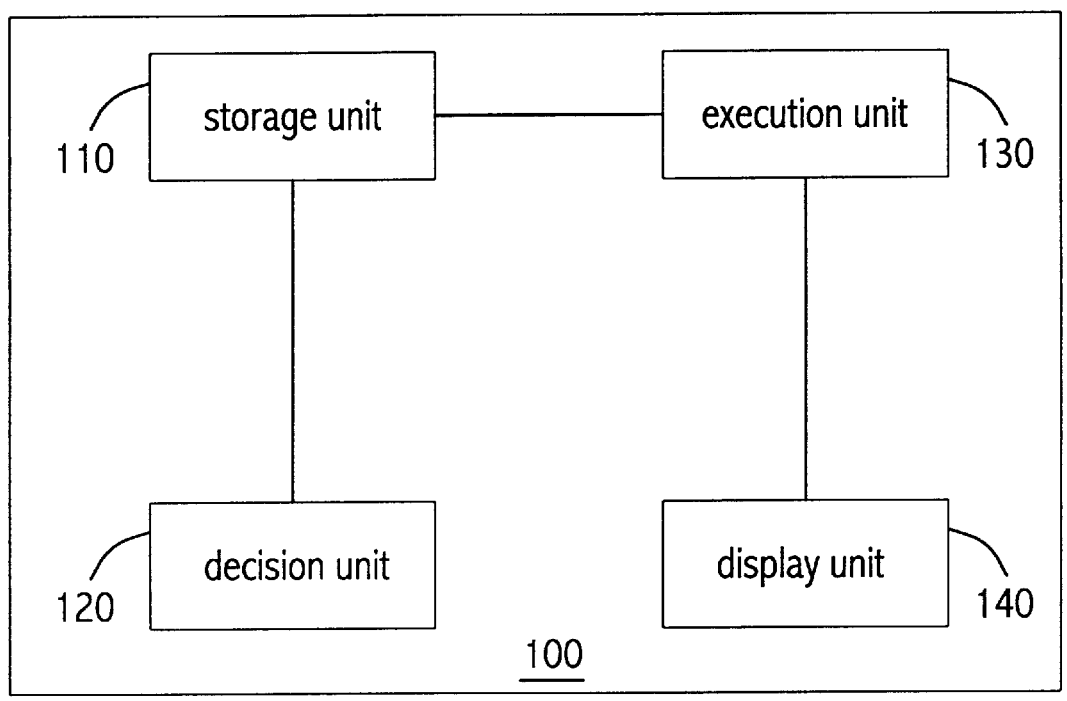
FIG. 1 is a block diagram showing a preferred embodiment of a computer system for performing the method for reminding the user in accordance with the present invention.

Referring now to FIG. 1, a schematic block diagram of a preferred embodiment of a computer system for performing the method for reminding the user in accordance with the present invention is presented. As shown, the computer system 100 can include a storage unit 110, a decision unit 120, an execution unit 130 and a display unit 140. the storage unit 110 is used to store a appearance-changing counter, a preset appearance-changing value, a appearance-changing period counter, a preset appearance-changing period value, a first coordinate value, a second coordinate value, a appearance-changing intermittence period time and a appearance-changing intermittence time. According to the present invention, the data in the storage unit 110 can be further provided to the decision unit 120 or the execution unit 130.

The decision unit 120 is used to determined if the value of the appearance-changing counter is less than the preset appearance-changing value and if the value of the appearance-changing period counter is less than the preset appearance-changing period value. The execution unit 130 is triggered by a particular event to perform repeatedly the step of assigning a coordinate parameter of an object of the computer system to be either a first coordinate value or a second coordinate value. Also, the execution unit 130 can add "1" to the value of the appearance-changing counter till the decision unit 120 finds that the value of the appearance-changing counter is equal to the preset appearance-changing value, and can add "1" to the value of the appearance-changing period counter till the decision unit 120 finds that the value of the appearance-changing period counter is equal to the preset appearance-changing period value. The display unit 140 is used to show the changing of coordinate upon the object executed by the execution unit 130. Following description will be devoted to explain how a typical embodiment of a stock client in accordance with the present invention can repeatedly vibrate or shift between two positions on the computer screen to remind the user. Definitely, it should be understood by those skilled in the art that various changes in form and detail of the embodiment may be without departing from the spirit and scope of the present invention.

Figure 2:
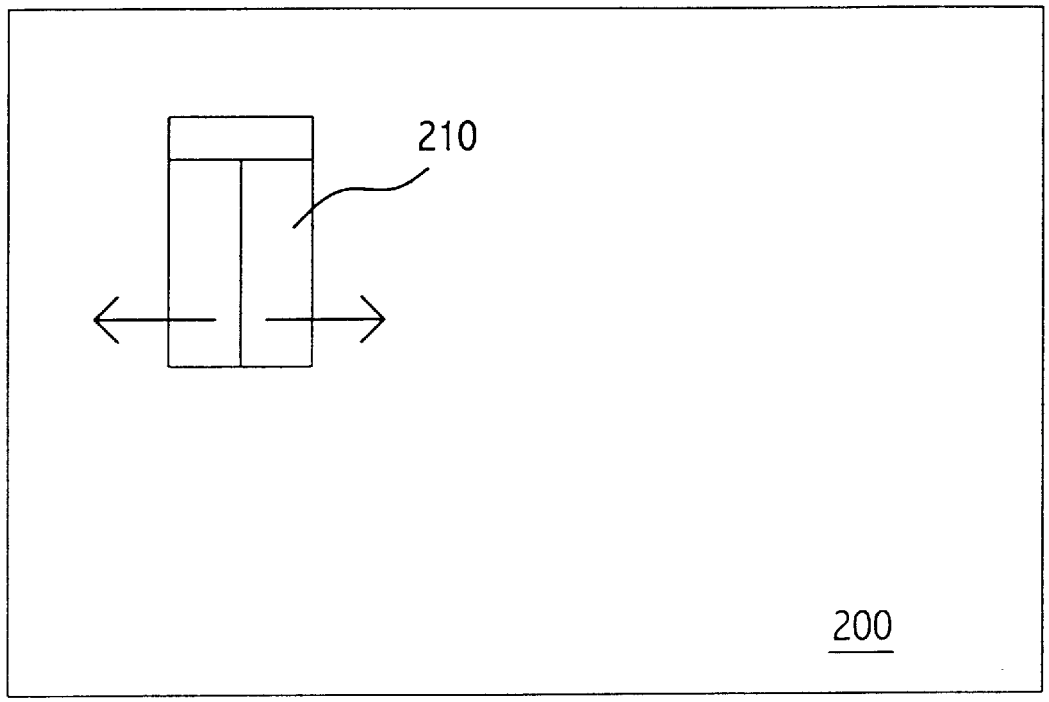
FIG. 2 is schematic view of a preferred stock client on a computer screen of the computer system of FIG. 1.

Referring now to FIG. 2, a schematic view of a preferred stock client on a computer screen of the computer system for performing the method for reminding the user in accordance with the present invention is illustrated. The stock client 210 is shown on the screen 200. When a connection between the computer system and a securities firm is established, the stock client 210 can then receive various information and service provided by the securities firm. Whenever the stock client 210 receive a predetermined particular event, say a price hike of a current-holding stock for example, the stock client 210 will vibrate on the screen 200 in the directions as shown by the arrows so as to remind the user of the computer system. Such a vibration can be done by repeatedly changing the position of the stock client 210 on the screen 200. Equivalently, the coordinate parameter of the stock client 210 is needed to be repeatedly changed so as to obtain the vibration result on the screen 200.

Figure 3:
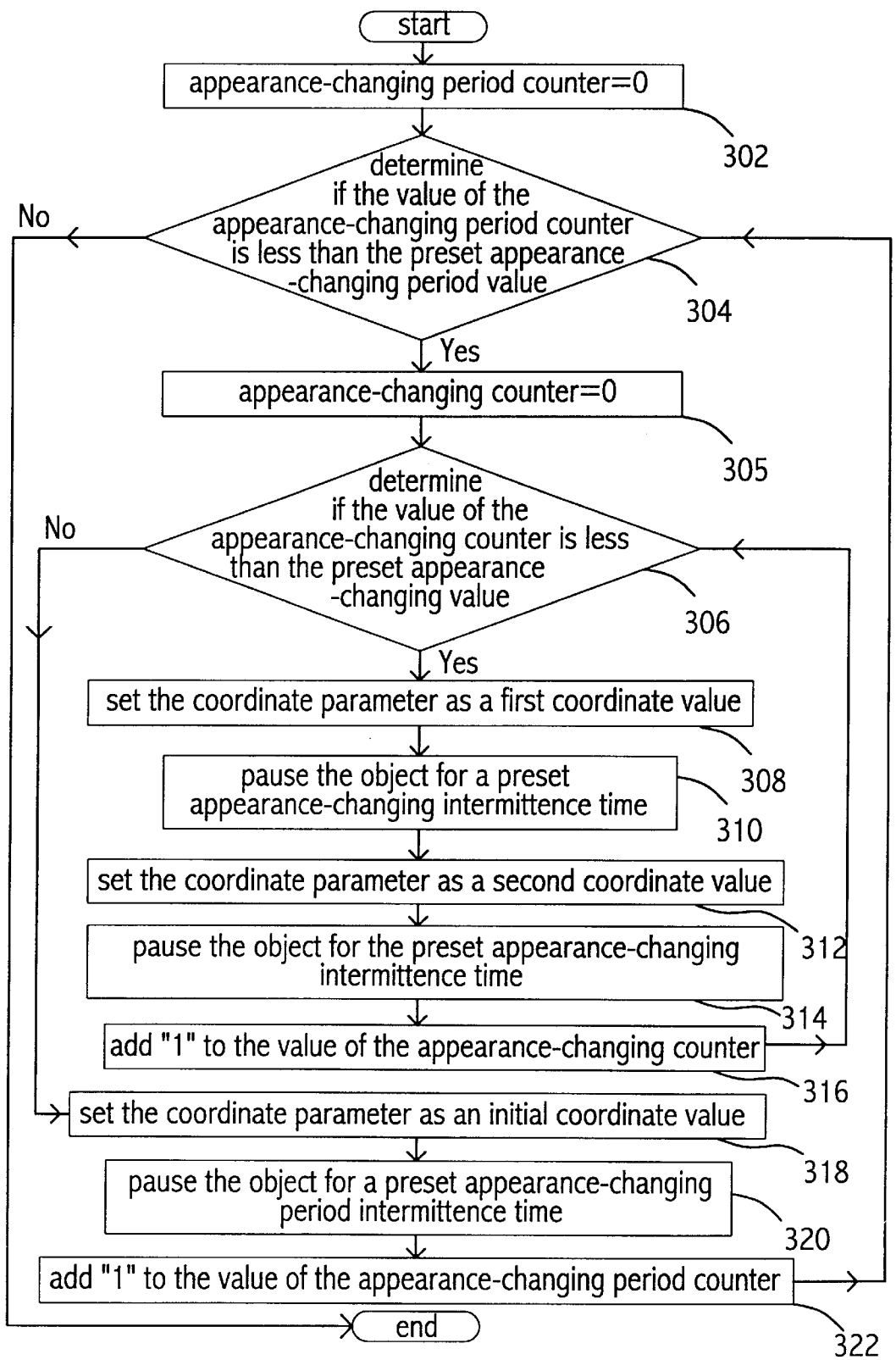
FIG. 3 is a flowchart of the method for reminding the user in accordance with the present invention for the stock client of FIG. 2.

Referring now to FIG. 3, a flowchart of the method for reminding the user in accordance with the present invention for the stock client 210 described above is shown. The method for the present invention is initiated by a preset particular event. As shown, the method can have two loops, an outer loop and an inner loop. The outer loop of the method is used to form a plurality of appearance-changing periods. On the other hand, the inner loop thereof is used to generate a plurality of vibrations in a single appearance-changing period. To control the outer loop, a preset appearance-changing period value and a appearance-changing period counter are provided. According to the present invention, the preset appearance-changing period value is defined as the required number of the vibration period, and the appearance-changing period counter is used to show the current accumulated value of the number of the vibration period. To control the inner loop, a preset appearance-changing value and a appearance-changing counter are introduced. According to the present invention, the preset appearance-changing value is defined as the required number of the vibration, and the appearance-changing counter is used to show the current accumulated value of the number of the vibration.

In step 302 shown in FIG. 3, the execution unit 130 referred to FIG. 1 assigns the initial value "0" to the value of the appearance-changing period counter. Then, the method can flow to step 304.

In step 304, the decision unit 120 referred to FIG. 1 determines if the value of the appearance-changing period counter is less than the preset appearance-changing period value. If yes, the method will be continued to step 305. Otherwise, the whole process of the method will be terminated.

In step 305, the execution unit 130 assigns an initial value "0" to the appearance-changing counter.

In the following step 306, the decision unit 120 determines if the value of the appearance-changing counter is less than the preset appearance-changing value. If yes, the method will be continued to step 308. Otherwise, the method will be continued to step 318.

In step 308, the execution unit 130 replaces the initial value of the coordinate parameter of the stock client 210 referred to FIG. 2 with a first coordinate value, in which the first coordinate value is definitely different to the initial value. The purpose of the step 308 is to shift the stock client 210 from an initial position on the screen 200 to a first position defined by the first coordinate value. Then, the method will be continued to step 310.

In step 310, the execution unit 130 pauses the stock client 210 at the first position on the screen 200 for a preset appearance-changing intermittence time.

In the following step 312, the execution unit 130 reassigns the coordinate parameter of the stock client 210 from the first coordinate value to a second coordinate value, in which the second coordinate value is definitely different to the first coordinate value. The purpose of the step 312 is to shift the stock client 210 from the first position on the screen 200 to a second position defined by the second coordinate value. Then, the method will be continued to step 314.

In step 314, the execution unit 130 pauses the stock client 210 at the second position on the screen 200 for another preset appearance-changing intermittence time.

As soon as the method completes the inner loop from step 308 to step 314, the stock client 210 is said to complete a vibration; i.e., a appearance change of the stock client 210 is finished. In the following step 316, the execution unit 130 adds "1" to the value of the appearance-changing counter and the method proceeds to step 306.

In step 318, the execution unit 130 can re-initiate the coordinate parameter of the stock client 210 to the initial coordinate value from the second coordinate value. The purpose of the step 318 is to shift the stock client 210 from the second position on the screen 200 to the initial position defined by the initial coordinate value. Then, the method will be continued to step 320.

In step 320, the execution unit 130 pauses the stock client 210 at the initial position on the screen 200 for a preset appearance-changing period intermittence time. Then, the method will be continued to step 322.

In step 322, the execution unit 130 adds "1" to the value of the appearance-changing period counter and the method proceeds to step 304.

In the present invention, the appearance parameter can be a 2-dimensional coordinate parameter, a 3-dimensional coordinate parameter, or the like; and, so are the first appearance-changing value and the second appearance-changing value.

In the embodiment described above, the method for the present invention achieve a visional vibration effect by repeatedly altering the coordinate parameter of the stock client 210. Yet, it shall be understood by those skilled in the art that various changes in form and detail upon the embodiment may be without departing from the spirit and scope of the present invention. For example, an appearance parameter of an object on the screen can also be utilized to be the target parameter as the coordinate parameter to be changed for alerting the user. The appearance parameter can be the area parameter, the color parameter, or any the like. In the case that the area parameter of the object is used, it can be foreseen that repeatedly changing the area parameter can have a shrinking and enlarging effect upon the object on the screen. In addition, changing the color parameter of the object can also obtain a noticeable effect on the screen to remind the user. Definitely, such substitutes for the applied parameter of the object are within the scope of the present invention.

By providing the method for reminding the user in accordance with the present invention, following advantages can be achieved.

(1) The reminder of the present invention is quiet.
(2) The reminder of the present invention is noticeable.
(3) The reminder of the present invention does not disturb or interrupt the current job of the user.

While the present invention has been particularly shown and described with reference to a preferred embodiment, it will be understood by those skilled in the art that various changes in form and detail may be without departing from the spirit and scope of the present invention.

What is claimed is:

1. A method for reminding a user, applied to a computer system, triggered by an event to change the appearance of an object on a screen of the computer system, including a preset appearance-changing value and a appearance-changing counter with an initial value "0", the method comprising:

a. determining if a value of the appearance-changing counter is less than the preset appearance-changing value; if yes, going to step b; otherwise, terminating the method;
   b. assigning a first appearance-changing value to a appearance parameter of the object;
   c. pausing for a appearance-changing intermittence time;
   d. assigning a second appearance-changing value to the appearance parameter of the object;
   e. pausing for the appearance-changing intermittence time; and
   f. adding "1" to the value of the appearance-changing counter and going to step a.

2. The method for reminding the user according to claim 1, wherein the object is a user interface.

3. The method for reminding the user according to claim 1, wherein the appearance parameter is a 2-dimensional coordinate parameter, the first appearance-changing value is a first 2-dimensional coordinate value, and the second appearance-changing value is a second 2-dimensional coordinate value.

4. The method for reminding the user according to claim 1, wherein the appearance parameter is a 3-dimensional coordinate parameter, the first appearance-changing value is a first 3-dimensional coordinate value, and the second appearance-changing value is a second 3-dimensional coordinate value.

5. The method for reminding the user according to claim 1, wherein the appearance parameter is an area parameter, the first appearance-changing value is a first area value, and the second appearance-changing value is a second area value.

6. The method for reminding the user according to claim 1, wherein the appearance parameter is a color parameter, the first appearance-changing value is a first color, and the second appearance-changing value is a second color.

7. A method for reminding a user, applied to a computer system, triggered by an event to change appearance of an object on a screen of the computer system, including a preset appearance-changing value, a appearance-changing counter, a preset appearance-changing period value and a appearance-changing period counter with an initial value "0", the method comprising:

a. determining if a value of the appearance-changing period counter is less than the preset appearance-changing period value; if yes, going to step b; otherwise, terminating the method;
   b. assigning "0" to a value of the appearance-changing counter;
   c. determining if the value of the appearance-changing counter is less than the preset appearance-changing value; if yes, going to step d; otherwise, going to step i;
   d. assigning a first coordinate value to a coordinate parameter of the object;
   e. pausing for a appearance-changing intermittence time;
   f. assigning a second coordinate value to the coordinate parameter of the object;
   g. pausing for the appearance-changing intermittence time;
   h. adding "1" to the value of the appearance-changing counter and going to step c; and
   i. adding "1" to the value of the appearance-changing period counter and going to step a.

8. The method for reminding the user according to claim 7, wherein the object is a user interface.

9. The method for reminding the user according to claim 7, wherein the step i further includes:
   assigning an initial value to the coordinate parameter of the object and then pausing for a appearance-changing period intermittence time.

10. The method for reminding the user according to claim 7, wherein the coordinate parameter is a 2-dimensional coordinate parameter, the first coordinate value is a first 2-dimensional coordinate value, and the second coordinate value is a second 2-dimensional coordinate value.

11. The method for reminding the user according to claim 7, wherein the coordinate parameter is a 3-dimensional coordinate parameter, the first coordinate value is a first 3-dimensional coordinate value, and the second coordinate value is a second 3-dimensional coordinate value.

12. A computer capable of reading media, a computer reading contents of the media to have the computer perform a method for reminding a user, the method being triggered by an event to change appearance of an object on a screen of the computer, the method including a preset appearance-changing value and a appearance-changing counter with an initial value "0", the method comprising:
 a. determining if a value of the appearance-changing counter is less than the preset appearance-changing value; if yes, going to step b; otherwise, terminating the method;
 b. assigning a first appearance-changing value to a appearance parameter of the object;
 c. pausing for a appearance-changing intermittence time;
 d. assigning a second appearance-changing value to the appearance parameter of the object;
 e. pausing for the appearance-changing intermittence time; and
 f. adding "1" to the value of the appearance-changing counter and going to step a.

13. The computer capable of reading media according to claim 12, wherein the object is a user interface.

14. The computer capable of reading media according to claim 12, wherein the appearance parameter is a 2-dimensional coordinate parameter, the first appearance-changing value is a first 2-dimensional coordinate value, and the second appearance-changing value is a second 2-dimensional coordinate value.

15. The computer capable of reading media according to claim 12, wherein the appearance parameter is a 3-dimensional coordinate parameter, the first appearance-changing value is a first 3-dimensional coordinate value, and the second appearance-changing value is a second 3-dimensional coordinate value.

16. The computer capable of reading media according to claim 12, wherein the appearance parameter is an area parameter, the first appearance-changing value is a first area value, and the second appearance-changing value is a second area value.

17. The computer capable of reading media according to claim 12, wherein the appearance parameter is a color parameter, the first appearance-changing value is a first color, and the second appearance-changing value is a second color.

18. A computer capable of reading media, the computer reading contents of the media to have the computer perform a method for reminding a user, the method being triggered by an event to change appearance of an object on a screen of the computer, the method including a preset appearance-changing value, a appearance-changing counter, a preset appearance-changing period value and a appearance-changing period counter with an initial value "0", the method comprising:
 a. determining if a value of the appearance-changing period counter is less than the preset appearance-changing period value; if yes, going to step b; otherwise, terminating the method;
 b. assigning "0" to a value of the appearance-changing counter;
 c. determining if the value of the appearance-changing counter is less than the preset appearance-changing value; if yes, going to step d; otherwise, going to step i;
 d. assigning a first coordinate value to a coordinate parameter of the object;
 e. pausing for a appearance-changing intermittence time;
 f. assigning a second coordinate value to the coordinate parameter of the object;
 g. pausing for the appearance-changing intermittence time;
 h. adding "1" to the value of the appearance-changing counter and going to step c; and
 i. adding "1" to the value of the appearance-changing period counter and going to step a.

19. The computer capable of reading media according to claim 18, wherein the object is a user interface.

20. The computer capable of reading media according to claim 18, wherein the step i further comprises:
 assigning an initial value to the coordinate parameter of the object and then pausing for a appearance-changing period intermittence time.

21. The computer capable of reading media according to claim 18, wherein the coordinate parameter is a 2-dimensional coordinate parameter, the first coordinate value is a first 2-dimensional coordinate value, and the second coordinate value is a second 2-dimensional coordinate value.

22. The computer capable of reading media according to claim 18, wherein the coordinate parameter is a 3-dimensional coordinate parameter, the first coordinate value is a first 3-dimensional coordinate value, and the second coordinate value is a second 3-dimensional coordinate value.

23. A computer system for reminding a user, comprising:
 a storage unit for storing a appearance-changing counter with an initial value "0", a preset appearance-changing value, a first appearance value, a second appearance value and a appearance-changing intermittence time;
 a decision unit for determining if a value of the appearance-changing counter is less than the preset appearance-changing value; and
 an execution unit triggered by an event to perform following steps:
  a. starting the decision unit to determine if the value of the appearance-changing counter is less than the preset appearance-changing value; if yes, going to step b; otherwise, terminating execution of the execution unit;
  b. assigning the first appearance-changing value to a appearance parameter of the object;
  c. pausing for the appearance-changing intermittence time;
  d. assigning the second appearance-changing value to the appearance parameter of the object;
  e. pausing for the appearance-changing intermittence time; and
  f. adding "1" to the value of the appearance-changing counter and going to step a.

24. The computer system for reminding the user according to claim 23, wherein the object is a user interface.

25. The computer system for reminding the user according to claim 23, wherein the appearance parameter is a 2-dimensional coordinate parameter, the first appearance-changing value is a first 2-dimensional coordinate value, and the second appearance-changing value is a second 2-dimensional coordinate value.

26. The computer system for reminding the user according to claim 23, wherein the appearance parameter is a 3-dimensional coordinate parameter, the first appearance-changing value is a first 3-dimensional coordinate value, and the second appearance-changing value is a second 3-dimensional coordinate value.

27. The computer system for reminding the user according to claim 23, wherein the appearance parameter is an area parameter, the first appearance-changing value is a first area value, and the second appearance-changing value is a second area value.

28. The computer system for reminding the user according to claim 23, wherein the appearance parameter is a color parameter, the first appearance-changing value is a first color value, and the second appearance-changing value is a second color value.

29. A computer system for reminding the user, comprising:
- a storage unit for storing a appearance-changing counter, a preset appearance-changing value, a appearance-changing period counter with an initial value "0", a preset appearance-changing period value, a first coordinate value, a second coordinate value, a initial value, a appearance-changing period intermittence time and a appearance-changing intermittence time;
- a decision unit for determining if a value of the appearance-changing counter is less than the preset appearance-changing value and if a value of the appearance-changing period counter is less than the preset appearance-changing period value; and
- an execution unit triggered by an event to perform following steps:
  a. starting decision unit to determine if the value of the appearance-changing period counter is less than the preset appearance-changing period value; if yes, going to step b; otherwise, terminating execution of the execution unit;
  b. assigning "0" to the value of the appearance-changing counter;
  c. starting the decision unit to determine if the value of the appearance-changing counter is less than the preset appearance-changing value; if yes, going to step d; otherwise, going to step i;
  d. assigning the first coordinate value to a coordinate parameter of the object;
  e. pausing for the appearance-changing intermittence time;
  f. assigning the second coordinate value to the coordinate parameter of the object;
  g. pausing for the appearance-changing intermittence time;
  h. adding "1" to the value of the appearance-changing counter and going to step c; and
  i. adding "1" to the value of the appearance-changing period counter and going to step a.

30. The computer for reminding the user according to claim 29, wherein the object is a user interface.

31. The computer for reminding the user according to claim 29, wherein the step i further includes:
assigning the initial value to the coordinate parameter of the object and then pausing for the appearance-changing period intermittence time.

32. The computer for reminding the user according to claim 29, wherein the coordinate parameter is a 2-dimensional coordinate parameter, the first coordinate value is a first 2-dimensional coordinate value, and the second coordinate value is a second 2-dimensional coordinate value.

33. The computer for reminding the user according to claim 29, wherein the coordinate parameter is a 3-dimensional coordinate parameter, the first coordinate value is a first 3-dimensional coordinate value, and the second coordinate value is a second 3-dimensional coordinate value.

* * * * *